United States Patent [19]
Sych et al.

[11] Patent Number: 6,145,043
[45] Date of Patent: Nov. 7, 2000

[54] BOOLEAN AND MOVEMENT ACCELERATOR

[75] Inventors: Terence Sych, Gilbert; Byron R. Gillespie; Ravi S. Rao, both of Phoenix, all of Ariz.

[73] Assignee: Intel Corporation, Santa Clara, Calif.

[21] Appl. No.: 09/092,101

[22] Filed: Jun. 5, 1998

[51] Int. Cl.⁷ .............................. G06F 13/00; G06F 7/00; H03K 19/00
[52] U.S. Cl. .......................... 710/126; 712/223; 708/230
[58] Field of Search ................................ 710/129, 131, 710/126, 100, 106, 52, 22; 714/801, 799, 764, 770, 6; 711/111, 112, 114; 709/231; 712/200, 223, 33; 340/825.06; 370/912; 708/230, 231

[56] References Cited

U.S. PATENT DOCUMENTS 5,838,892  11/1998  Wilson.

Primary Examiner—Gopal C. Ray
Attorney, Agent, or Firm—Blakely, Sokoloff, Taylor & Zafman LLP

[57] ABSTRACT

An application accelerator (AA) unit that in one embodiment is part of an I/O processor (IOP) integrated circuit. The AAU includes logic circuitry for improving the performance of storage applications such as Redundant Array of Inexpensive Disks (RAID). A boolean unit performs operations such as exclusive-or (XOR) on multiple blocks of data to form the image parity block which is written to the redundant disk array. The AAU is associated with a memory-mapped programming interface that allows software executed by a core processor in the IOP to utilize the AAU for accelerating RAID storage applications as well as local memory DMA-type transfers, using the descriptor construct.

33 Claims, 5 Drawing Sheets

BOOLEAN AND MOVEMENT ACCELERATOR

RELATED APPLICATION

This invention is related to U.S. patent application entitled, "Integrated Accelerator for Storage and Networking Applications," filed concurrently herewith and assigned Ser. No. 09/092,275, U.S. Pat. No. 6,070,182.

BACKGROUND INFORMATION

1. Field of the Invention

This invention is related generally to logic circuits and more particularly to those performing boolean operations and data movement.

2. Description of Related Art

Logic circuits performing boolean operations and data movement can be used in a wide range of computer system applications. One such application is reliable data storage using a Redundant Array of Independent or Inexpensive Disks (RAID).

The computer system in a RAID application features a number of disk drives used for fault tolerance and performance, particularly with servers. Some RAID applications provide fault tolerance by performing what is conventionally known as the "RAID algorithm" which involves the compute-intensive task of updating parity information associated with a series of data blocks that are stored in the array of disk drives. Each time new data is to overwrite existing data in the series, a new parity block is computed for the series and also stored in the array. The parity block is generated by partitioning the new data into smaller blocks, and then performing a bitwise exclusive-or (XOR) operation between these new blocks and possibly one or more other existing blocks from the series. These XOR operations continue in this way until all targeted blocks in the series have been XORed with the new blocks, resulting in an updated parity block for the series. The updated parity block and the new data block(s) are then written to the redundant array.

In such a RAID application, a relatively large number of XOR operations are performed because the parity block will need to be generated each time there is a write to the disk array. Accelerating the rate at which these parity blocks are generated can greatly benefit the overall performance of such an application.

The RAID application has typically been implemented in computer systems having an intelligent I/O subsystem. The I/O subsystem may be one which complies with the popular Intelligent I/O (I$_2$O®) interface for Peripheral Components Interconnect (PCI) bus applications. Such a computer is divided into a local bus, a primary PCI bus, and a secondary PCI bus, where the I/O devices normally reside on the secondary PCI bus, the host system resides on the primary PCI bus, and a subsystem processor (e.g., a core processor in an integrated circuit) is coupled to the local bus. The primary and secondary PCI buses are coupled by a bridge. The I/O subsystem typically includes a single integrated circuit die known as an I/O processor (IOP). The salient functions traditionally integrated on the single chip I/O processor include part of the local bus, a core (subsystem) processor, a memory controller, the bridge, and address translation units that are coupled between the local bus and the primary and secondary PCI buses.

A RAID storage application typically has an intelligent agent being, for instance, a disk controller complying with the popular SCSI (Small Computer Systems Interface), that resides on the secondary PCI bus and controls access to the array of disk drives. When the host determines a need to write new data to the array, it notifies the IOP of its need and allows the core processor to take over the task of preparing the new data (normally stored in host memory) for storage in the array. Currently, a software solution for the RAID storage application exists involving the core processor reading the new data, computing the parity block, and writing the parity block to the disk array. This approach, however, may become inadequate with large amounts of data (e.g., larger block size) and with the relatively limited capability of the core processor in current I/O processor designs. A second drawback to this approach is that while the core processor is busy updating the parity block, all of the other tasks of the core processor must be delayed, thus slowing down the overall execution of the storage application.

Therefore, it would be desirable to have a different solution to the problem of generating a parity block, one that helps perform the RAID application more efficiently and expediently.

SUMMARY

The invention in one embodiment is directed at an accelerator circuit having a boolean unit for performing a boolean operation on first and second data words to output a result word, and a buffer coupled to the boolean unit and having capacity for storing at least one block of data, each block being a number of words. The circuit stores the first word in the buffer, performs the boolean operation on the first and second words, and stores the result word in the buffer overwriting the first word.

BRIEF DESCRIPTION OF THE DRAWINGS

The above briefly summarized features of an embodiment of the invention, as well as other embodiments, features and advantages, will be apparent from the following detailed description, claims, and figures where:

DETAILED DESCRIPTION

As briefly summarized above, the invention presents an application accelerator unit (AAU) that can be integrated into a data processor such as an I/O processor (IOP). In addition to accelerating a RAID storage application using a built-in boolean unit, the same AAU may also be configured to expediently move data from one location in a local memory to another without performing any boolean operation.

Figure 1:
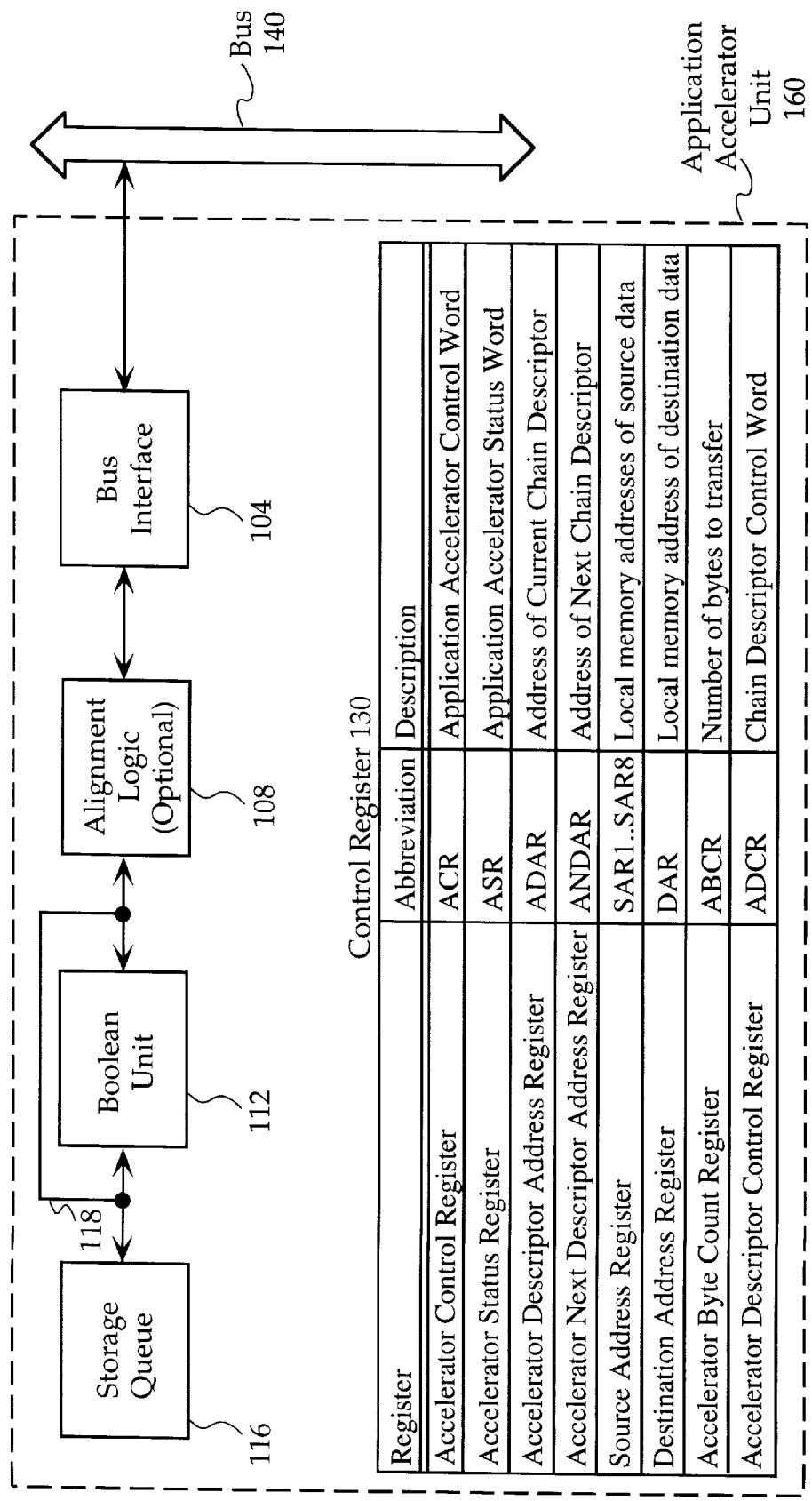
FIG. 1 is a block diagram of the application accelerator unit according to one embodiment of the invention.

FIG. 1 illustrates a block diagram of an embodiment of an AAU 160 according to an embodiment of the invention. The AAU 160 contains a boolean unit 112 coupled to a bus interface 104 and optional alignment logic 108. The data path between the boolean unit and the bus interface is bi-directional. Data from the bus interface may also bypass the boolean unit using data path 118 or, alternatively, go through the boolean unit unchanged, into a storage queue 116.

The boolean unit 112 is configured to perform a boolean operation using a first data word from the storage queue 116 and a second data word from the bus interface 104 as the operands. Each of the data words had been received in different bus cycles of the bus 140, where the first data word is passed unchanged through or around the boolean unit 112 and stored in the storage queue 116. A boolean function is performed when the second data word arrives at the boolean unit 112 from the bus interface 104 in a subsequent cycle of the bus 140.

The storage queue 116 is a specialized buffer for temporarily storing data while waiting for any one of a number of events to occur, including a boolean operation performed using existing data in the queue, arrival of new data to overwrite the existing data, and transfer of the existing data to the bus 140 via data path 118. Depending on how the AAU is configured (see, e.g., control registers 130 below), the existing data in storage queue 116 may be either written back to the bus 140 or may be held in the queue 116 for further processing by the AAU. The size (width) of the queue and its depth may be selected in view of the amount of data to be transferred from the bus in each cycle of the bus. For example, in the embodiment of FIG. 3 which is further described in detail below, the storage queue is arranged as 8 bytes wide (64 bits) by 16 deep when used with a 64-bit bus.

Figure 4:
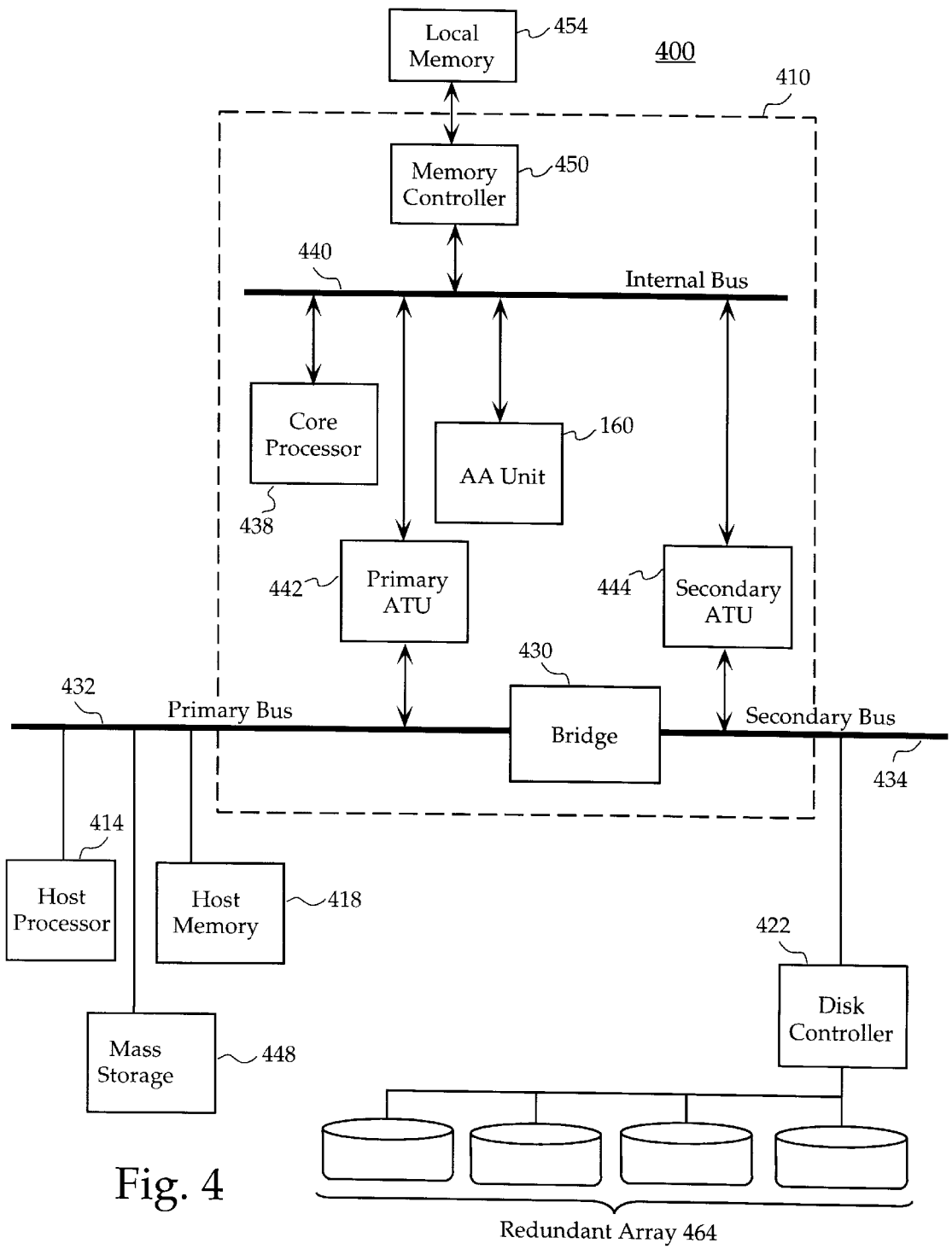
FIG. 4 illustrates an embodiment of the invention as a multiple bus computer system featuring an application accelerator unit.

In one embodiment, all data transfers to and from the bus 140 by the AAU are configured through a programming interface (e.g., using a number of memory-mapped control registers 130 that may be accessible from the bus 140) and one or more descriptors located in a local memory 454 coupled to the bus 140 (see FIG. 4). A data transfer is defined in part by the source address, destination address, number of bytes to transfer, and control values that determine the type of operation (e.g., boolean or data movement) to be performed by the AAU 160. This information defining the data transfer is normally loaded into a descriptor in the local memory 454 before the transfer begins. The AAU can then be instructed to read the contents of the descriptor and accordingly configure its control registers 130. The registers 130 and their functionalities are described in a separate section below.

Once the control registers 130 are configured for the transfer, the AAU reads data blocks from the local memory 454, performs the specified operation, and writes the result blocks to a location in local memory 454 specified by the destination address. To perform complex operations involving multiple data blocks where each block is defined as a number of words, descriptors may be linked or chained together, as described, for example, in i960®RP *Microprocessor Users Manual*," Intel Corporation, February 1996, Chapter 20, DMA Controller.

Figure 2A:
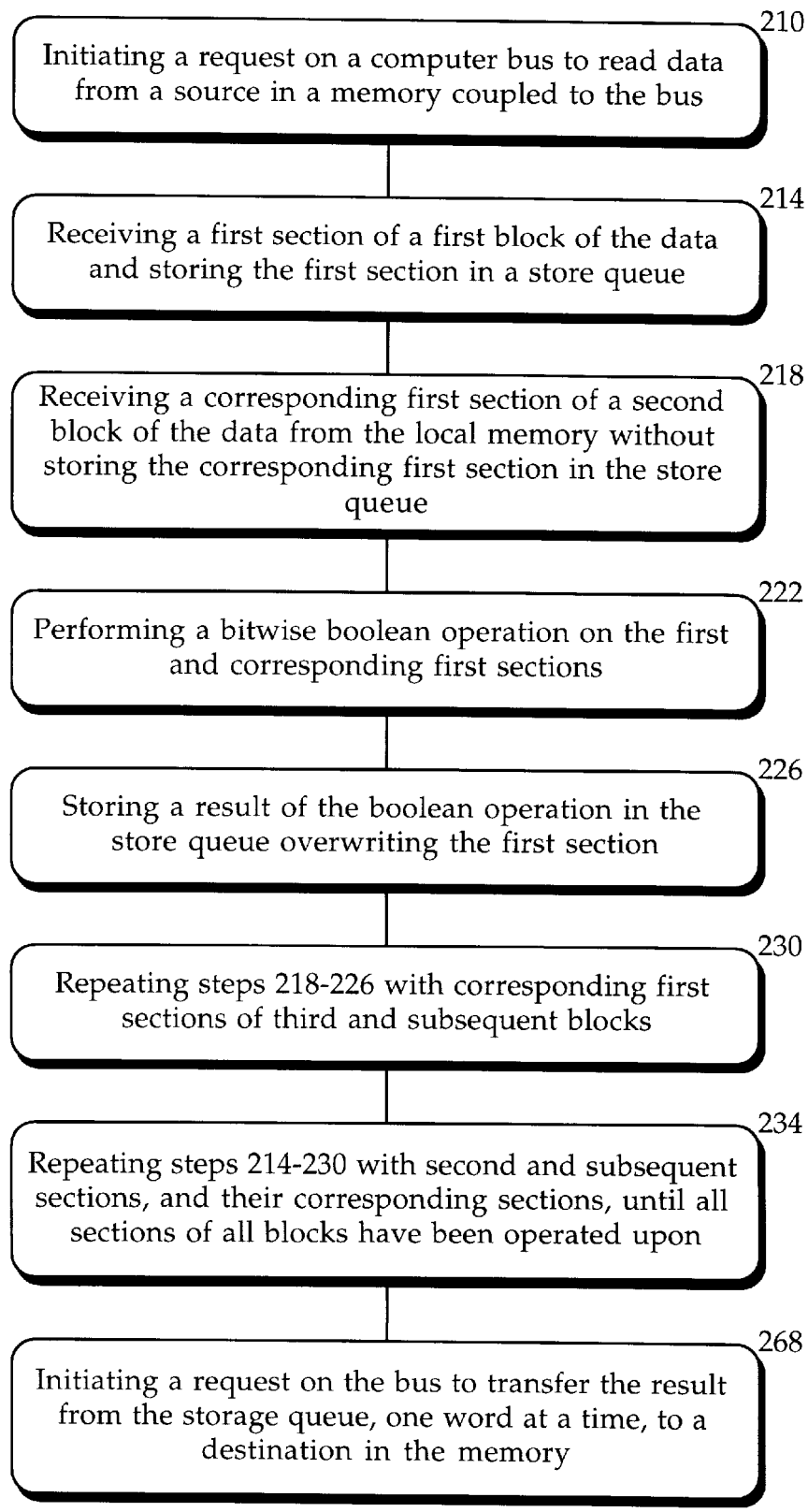
FIG. 2A is a list of the steps for accelerating a storage application by an embodiment of the invention.
Figure 3:
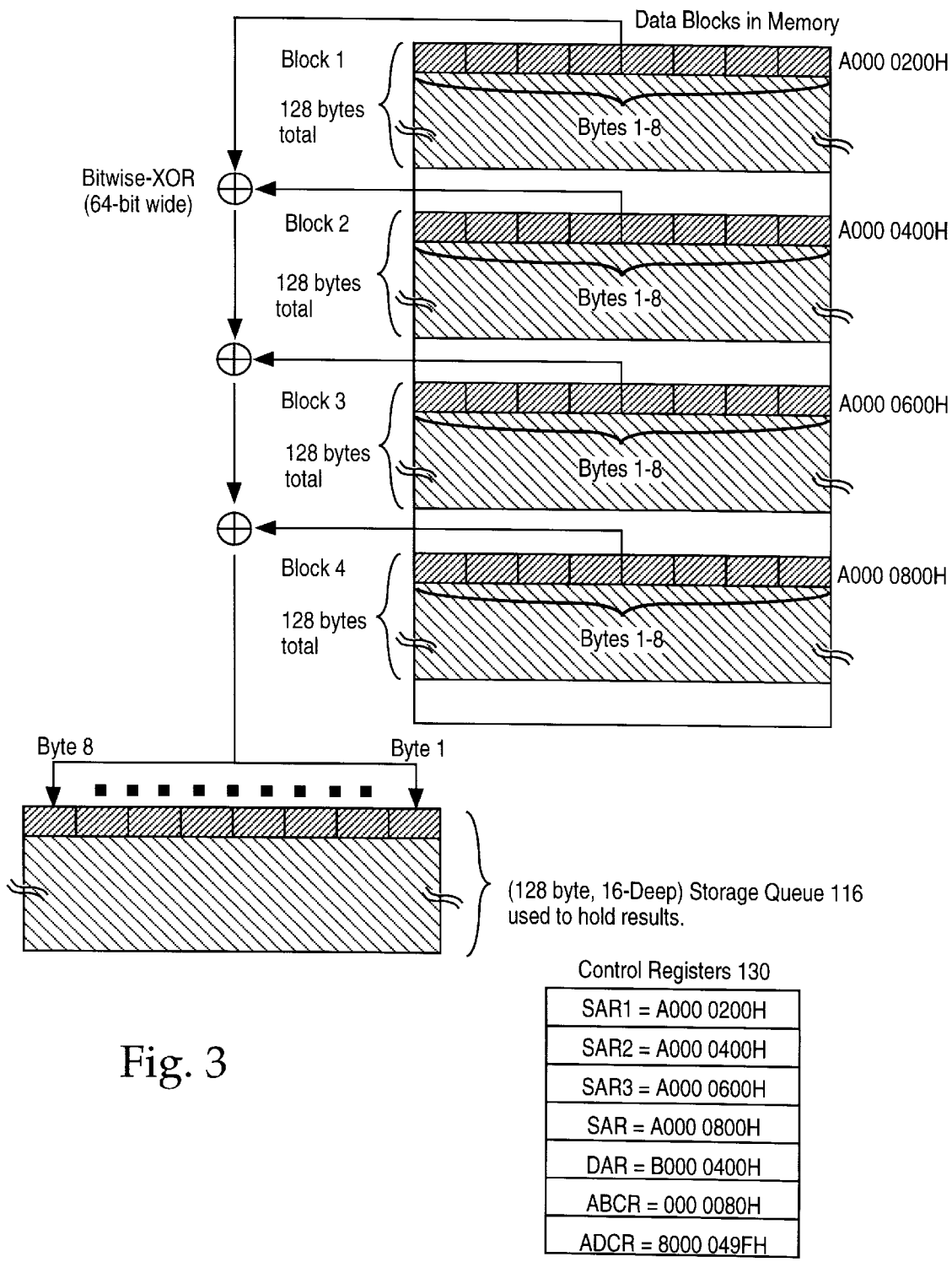
FIG. 3 illustrates the bitwise XOR operation performed on multiple blocks according to an embodiment of the invention.

FIGS. 2A and 3 illustrate an embodiment of the invention as operations performed by the AAU 160 in a data transfer implementing a boolean operation such as one used in a RAID storage application. FIG. 2A shows a number of operation steps that result in the flow of data shown in FIG. 3. FIG. 3 shows four blocks of source data that exist in local memory and that are to be XORed, the result to be stored back into local memory. Each block has 128 bytes, the AAU being configured to perform an XOR on 8-byte segments. The figure also shows values in the control registers 130 of the AAU that indicate the starting addresses SAR1 ... SAR4 of each block in local memory, a byte count value ABCR that specifies the number of bytes in each block (80 H=128 bytes), the destination address DAR of the result block specified in the destination address register, and the address of the current chain descriptor in the local memory ADCR that defines this transfer.

The sequence of operations performed in FIGS. 2A and 3 may be collectively described as follows. Once a descriptor has been configured in local memory, and its location in local memory has been written into the control registers 130, the AAU acts as a master on the internal bus to read the descriptor and load the control registers 130 with the information defining the data transfer. Operation begins with step 210 where the AAU initiates data transfer from the location pointed to by the first source address register (SAR1). The first 8 bytes of data for this block 1 are transferred directly into the storage queue after passing through the bus interface and alignment logic, as indicated in step 214. The number of bytes transferred depends on a number specified in the control registers 130 (see the description of ABCR below).

The AAU in step 218 then reads the first 8 bytes of a block 2 from the address pointed to by the second source address register (SAR2) through the alignment logic and into the boolean unit without storing the data in the store queue. In step 222, the boolean unit then performs a 64-bit wide bitwise XOR on the first 8-bytes of block 1 and the first 8 bytes of block 2 as seen in FIG. 3. This first XOR result is then transferred to the storage queue and overwrites the first 8 bytes of previously written data of block 1 as in step 226. The process in steps 218–226 then repeats with the transfer and XOR of the first 8 bytes of data for blocks 3 and 4 from the local memory which fills the first 8-byte section of the storage queue with a resulting data word.

The steps 214–230 are repeated for second and subsequent 8-byte sections in blocks 1–4, for a total of 16 8-byte sections of result data (or 128 bytes), completely filling the storage queue.

Once all of the designated blocks have been operated upon and the resulting data block (being in this instance the image parity block for a RAID storage application) is in the storage queue, the AAU initiates a write to local memory 454 (see FIG. 4) to store the resulting data block at the address indicated in its control register 130 (see the description of the register DAR below).

Figure 2B:
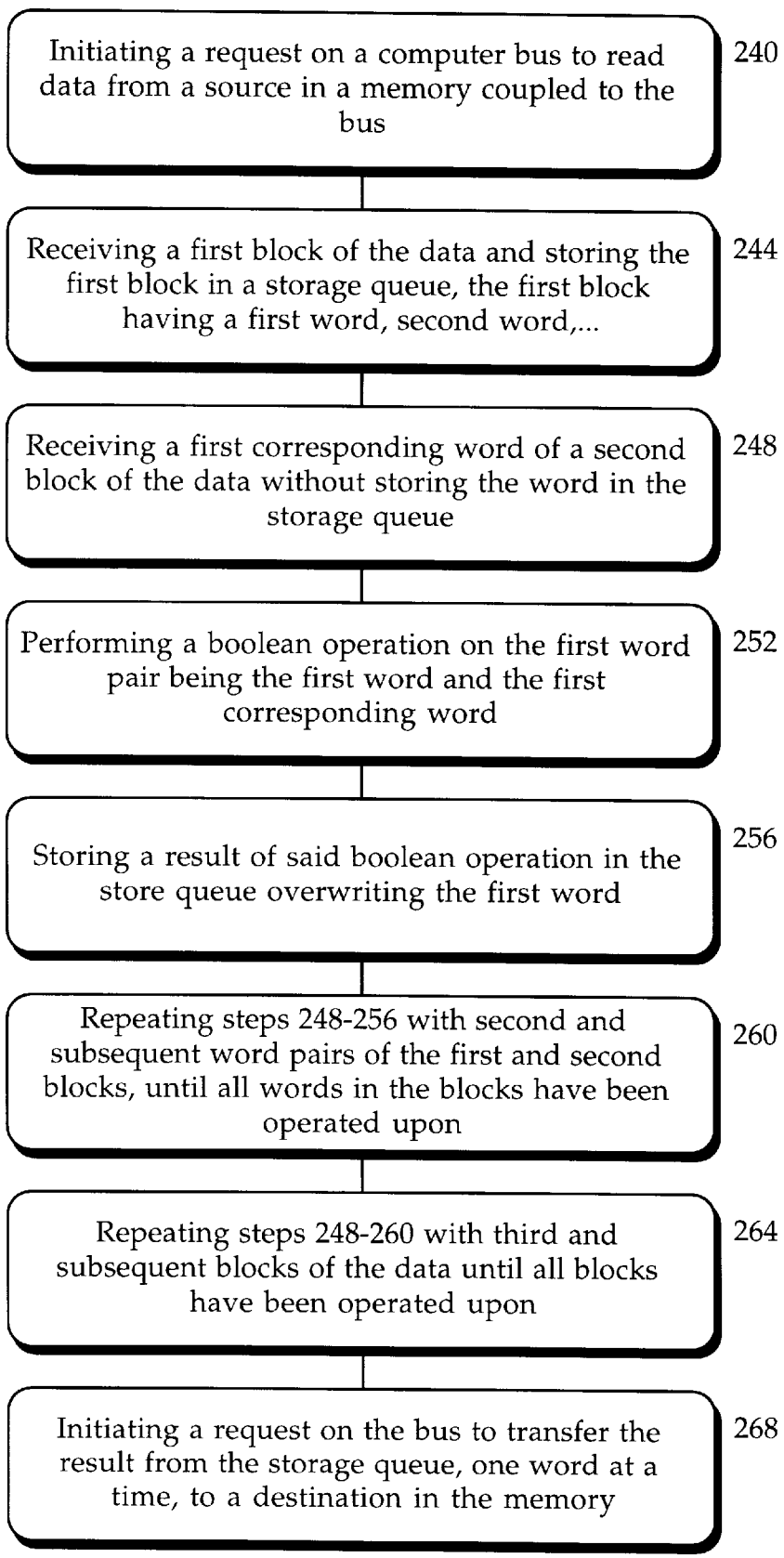
FIG. 2B shows steps for accelerating the storage application by another embodiment of the invention.

Another way to perform the boolean operation on multiple blocks of data is illustrated in FIG. 2B. There, the first block is read in its entirety and stored in the storage queue 216 before the second block is read. The second block is then read one word at a time, the boolean operation is performed, and the resulting words overwrite the first block one word at a time. The third block is then read one word at a time, and so forth until all targeted blocks are read and the storage queue 216 holds the resulting parity block. The resulting block is then transferred to the local memory. These operations are outlined as steps 240–268 in FIG. 2B that are self-explanatory.

The above has described ways of using the AAU for accelerating the performance of boolean operations on multiple blocks of data. To achieve simple data movement between two locations in the local memory, the AAU can be programmed to allow all of the data words of a block of data to bypass the boolean unit and be stored in the queue. Once the desired block has been stored in the queue, the AAU transfers the block from the queue through path 118 (see FIG. 1) back to the bus 140 to be written to a destination specified in its programming interface. Thus, the architecture that accelerates boolean operations can also be used to accelerate simple data movement in the local memory.

FIG. 4 illustrates yet another embodiment of the invention as a computer system 400 having a multiple bus architecture based on the PCI *Local Bus Specification*, Rev. 2.1, Oct. 21, 1994 published by the PCI Special Interest Group, Portland, Oreg. The computer system 400 features a system bus that has two physical portions, a primary PCI bus 432 and a secondary PCI bus 434. The two buses are coupled by a bridge 430. The computer system 400 includes a host processor 414 coupled to a host memory 418 via the primary bus 432, and a disk controller 422 on the secondary PCI bus 434. The disk controller couples a number of disks in a redundant array to carry out a RAID application.

A data processor 410 provides for intelligent I/O with the help of a core processor 438 and memory controller 450 coupled to an internal bus 440. This embodiment of the data processor 410 is an integrated circuit (IC) die known as an I/O processor (IOP). In one embodiment, the internal bus 440 is kept inside the data processor die, thus permitting the width of internal bus 440 to be easily increased over one that extends outside the die to obtain better performance from data transfers involving the AAU. The memory controller 450 interfaces a local memory 454 that may include random access memory (RAM) such as Synchronous Dynamic RAM (SDRAM). The local memory 454 contains the instructions and data for execution and use by the core processor 438. Communication between the PCI system buses and the internal bus 440 is accomplished through primary and secondary address translation units (ATUs) 442 and 444, and one or more direct memory access (DMA) channels (not shown). The architecture permits I/O operations, which are interrupt intensive tasks involving the peripheral devices on the secondary bus 434, to be routed away from the host processor 414 for handling by the core processor 438.

The data processor 410 also includes an AAU 160 coupled to the internal bus. The AAU itself performs independent data transfers to and from the local memory 454 based on commands that were previously written to its programming interface by the core processor 438. Independent data transfers means that the AAU can act as a master on the internal bus, and access data in the local memory 454 without relying on or interacting with the core processor 438. Using the internal bus, the AAU 160 reads data via the memory controller 450, performs a boolean operation (or none) on the read data, and transfers the results back to a location in local memory 454 specified in its programming interface.

In one possible scenario involving a storage application, the host processor 414 is configured to notify the data processor 410 (e.g., interrupt the core processor 438) in response to a need for a write of a new block of data to the redundant array 464. The host processor 414 or the data processor 410 causes the new block to be transferred from the host memory 418 to the local memory 454 prior to being operated on by the AAU. The core processor 438 then causes selected targeted blocks of data to be transferred from the redundant array 464 to the local memory 454. The AAU then performs XOR operations on the new and target blocks in the local memory 454 as steps towards computing a parity data block, as described above in the embodiments of FIGS. 1–3. After the AAU has completed its task of computing the parity block and placing it in the local memory, the AAU notifies the core processor 438. The parity block and the new block may then be transferred from the local memory to the redundant array without the host processor 414 being involved.

The embodiment of the AAU 160 in FIG. 1 also contains an optional alignment logic 108. The alignment logic enables data transfers from and to unaligned addresses in the local memory 454 (see FIG. 4). Better performance may be obtained from aligned transfers, where the desired data is located at an address that is aligned with or starts at a predefined boundary. For example, the particular embodiment of the invention in FIG. 1 can be used in a system with an 8-byte (64 bits) boundary. The AAU is configured to process 8 bytes in each internal bus clock cycle. If the starting address of a data block (having multiple 8-byte components) requested by the AAU does not lie on an 8-byte boundary, then the alignment logic rotates or shifts the received data block so that the first byte received by the boolean unit, stored in the storage queue, or received by the adder logic, contains the desired data. If the alignment logic 108 is not used, then the data arriving into the AAU at the bus interface should have been aligned in software, e.g., using instructions executed by the core processor 438.

Register Definitions

Having generally described the boolean and data movement functions performed in the AAU, another more particular embodiment of the invention is now presented in which the AAU contains a number of memory-mapped control registers 130 that control its operation. Some of the control registers 130 may have been referenced above, but are now described in more detail. FIG. 1 illustrates an exemplary group of such registers which are briefly described below.

The accelerator controller register (ACR) specifies parameters that dictate the overall operating environment of the AAU. The ACR should be initialized prior to all other AAU registers following a system reset. The register may be read or written to while the AAU is active. The ACR contains an AAU enable bit field which when set enables the AAU to transfer data. A chain resume bit can also be provided which causes the AAU to resume chaining by reading the current descriptor located at the address specified in the accelerator descriptor address register (ADAR).

The accelerator status register (ASR) contains status flags. The register may be read by software to examine the source of an interrupt generated by the AAU. Interrupts are caused by the normal termination of a transaction or by an error occurring when the transaction is being carried out by the AAU.

The accelerator descriptor address register (ADAR) contains the address of the current chain descriptor in the local memory that is used for a boolean transfer. This is normally a read-only register that is loaded when a new chain descriptor is read by the AAU. The accelerator next descriptor address register (ANDAR) contains the address of the next chain descriptor in the local memory.

Each source address register (SARx) may contain a starting local memory address of a block of data. Each register is loaded (when a chain descriptor is read from the local memory) with the starting address of a block of data to be operated upon by the AAU.

The destination address register (DAR) contains a local memory address where the result of the boolean operation is stored. The value in the DAR is continuously updated by the AAU as the boolean operation is performed on each section of each block of data. As such, the DAR is normally a read-only register.

The accelerator byte count register (ABCR) is a read-only register that is loaded by the AAU with the byte count word in a chain descriptor. The ABCR contains the number of bytes to transfer for the current chain descriptor. Any time the ABCR is read by the core processor, the value read indicates the number of bytes left to complete the boolean operation for the particular chain descriptor. The register is decremented by a given number of bytes for every successful transfer from the storage queue to the destination in local memory. A value of zero in the ABCR may be a valid byte count and result in no read or write cycles being generated to the memory controller unit.

The accelerator descriptor control register (ADCR) contains values that control the data transfer on a per chain descriptor basis. The register is normally read-only and is loaded by the AAU when a chain descriptor is read from the local memory. The ADCR may contain a number of fields, including the following:

A Destination Write Enable bit determines whether data present in the storage queue may be written out to the local memory. If set, data in the queue will be flushed to the address specified in the DAR after performing the specified operation in the command control field (see below). When clear, the data will be held in the queue.

The Supplemental Block Control Interpreter is a bit field that specifies the total number of data blocks on which the XOR transfer operation or the network checksum calculation is to be performed. For example, in the embodiment of the invention operating as FIG. 4, there are four data blocks to be operated upon. The Block Control field can be changed to indicate a greater number of blocks if additional source address registers are provided in the AAU. This capability allows the AAU to fetch extra blocks of data for boolean operation if needed (as determined by the system application) while AAU is operating.

The Block x Command Control field specifies the type of operation to be carried out on the particular block of data pointed to by the corresponding SARx register. With respect to the first block of data, a DirectFill command will signify that the data in the first block be transferred directly from the local memory to the storage queue, thus bypassing the boolean unit. At least four additional different commands are contemplated. For instance, a Null command implies that the particular block may be disregarded for the current chain descriptor. In other words, the AAU will not transfer data from this block when processing the current chain descriptor. An XOR command implies that the block will be transferred to the AAU to execute an XOR boolean function.

To summarize, the embodiments of the invention described above are directed at an application accelerator unit that may be coupled to a bus in a single integrated circuit data processor such as an I/O processor (IOP). The AAU includes logic circuitry for improving the performance of storage applications such as RAID. A boolean unit is coupled to a storage queue that contains the first operand for the boolean function, the second operand arriving in a subsequent bus cycle. The boolean unit may be configured to perform XOR on the operands to generate a parity block of data needed by the RAID storage application.

The AAU in one embodiment includes a memory-mapped programming interface that allows software executed by the core processor of the IOP to program the AAU using the descriptor construct. The programmed AAU can accelerate storage applications, but also provide for high-speed direct memory access (DMA)-type transfers of data from one area in the local memory to another.

The embodiments of the invention are, of course, subject to other variations in structure and implementation. For example, the embodiments have been described using a 64-bit internal bus, but one of ordinary skill in the art will recognize that the invention may also be applied to narrower or wider buses. Also, some of the control registers of the AAU may have read/write access, while others may be read-only once the values of the registers have been loaded from the chain descriptor. Therefore, the scope of the invention should be determined not by the embodiments illustrated but by the appended claims and their legal equivalents.

What is claimed is:

1. An accelerator circuit comprising:

boolean unit to perform a boolean operation on first and second data words to output a result word; and buffer coupled to the boolean unit and having capacity to store at least one block of data, each block being a plurality of words, the circuit being configured to store the first word in the buffer, perform the boolean operation on said first and second words, and store the result word in the buffer overwriting the first word, and further configured to store a first block in the buffer before the boolean unit receives a second block one word at a time.

2. The accelerator circuit of claim 1 configured with the boolean operation being a bit-wise exclusive-or.

3. The accelerator circuit of claim 1 further comprising:

a data path around the boolean unit for the first word to bypass the boolean unit and be stored in the buffer.

4. The accelerator circuit of claim 1 further comprising:

bus interface coupled to the boolean unit for receiving first and second data words.

5. The accelerator circuit of claim 4 configured to receive the first and second data words by the bus interface in consecutive cycles of a bus clock.

6. The accelerator circuit of claim 1 wherein the buffer is a semiconductor solid state device.

7. A data processor comprising:

internal bus;

accelerator circuit coupled to the internal bus, the accelerator circuit having bus interface coupled to the internal bus;

boolean unit to perform a boolean operation on first and second data words received from the bus interface to output a result word; and buffer coupled to the boolean unit and having capacity to store at least one block of data, each block being a plurality of words, the accelerator circuit to store the first word in the buffer, perform the boolean operation on said first and second words, store the result word in the buffer overwriting the first word, and transfer the result word to the bus interface, and further configured to store a first block in the buffer before the boolean unit receives a second block one word at a time.

8. A data processor as in claim 7 further comprising:

memory controller coupled to the internal bus to communicate with the accelerator circuit through the internal bus.

9. A data processor as in claim 7 further comprising:

a plurality of memory-mapped address registers being a programming interface to the accelerator circuit for programming the addresses of the first and second words and the result word.

10. A data processor as in claim 9 wherein one of the address registers is configured to receive the address of a descriptor, the descriptor to specify the starting address of a block of data containing said first word.

11. A data processor as in claim 9 wherein the address registers specify the addresses of a plurality of linked descriptors, the data processor being further configured to perform the boolean operation on a plurality of blocks of data specified by the linked descriptors.

12. A data processor as in claim 9 further comprising: processor coupled to the bus, the processor being configured to access the memory-mapped registers to program the addresses of the first and second words into the registers.

13. The data processor of claim 9 wherein the accelerator circuit is configured with a source address of a block of data and destination address, the circuit being configured to fetch the block from the source address and store the block in the buffer, and subsequently transfer the block from the buffer to the destination address without performing the boolean operation.

14. A data processor as in claim 9 wherein the internal bus, accelerator circuit, and the plurality of memory mapped address registers are formed on the same integrated circuit die.

15. A computer system comprising:
   local memory;
   data processor having an internal bus, the local memory being coupled to the internal bus; and
   application accelerator unit (AAU) integrated in the data processor and coupled to the internal bus, the AAU having a boolean unit to perform a boolean operation on first and second data words to output a result word and a buffer coupled to the boolean unit and having capacity to store a block of data being a plurality of words, the AAU to fetch the first word and the second word from the local memory and store the first word in the buffer, perform the boolean operation on said first and second words, and store the result word in the buffer overwriting the first word, the AAU being further configured to store a first block in the buffer before the boolean unit receives a second block one word at a time.

16. The computer system of claim 15 further comprising:
   primary and secondary buses, coupled to the data processor;
   host processor and host memory coupled to the primary bus; and
   mass storage coupled to the secondary bus, the host processor being configured to notify the data processor in response to executing instructions stored in host memory indicating that the first word is to be written to the mass storage, the first word to be transferred from the host memory to the local memory and the second word to be transferred from the mass storage to the local memory prior to being operated on by the AAU, the system being further configured to transfer the result word from the memory to the mass storage.

17. The computer system of claim 15 further comprising:
   memory controller coupled between the internal bus and the local memory, the memory controller to fetch the first and second words from the local memory in response to requests from the AAU.

18. The computer system of claim 15 further comprising:
   a plurality of memory-mapped registers being a programming interface to the AAU for specifying addresses in the local memory of the first and second words, and the result word; and
   core processor coupled to the bus, the core processor being configured to access the memory-mapped registers to write the source and destination addresses into the registers.

19. The computer system of claim 18 wherein the data processor, the plurality of memory mapped registers, and the core processor are formed on the same integrated circuit die.

20. The computer system of claim 18 wherein the registers are programmable to specify that a block of data be moved from a source location to a destination location, the AAU in response to reading the registers is configured to fetch the block of data from the memory, store the block in the buffer, and write the block to the memory without performing the boolean operation.

21. The computer system of claim 15 wherein the data processor is formed as part of a single integrated circuit die.

22. A method comprising:
   a) storing a first block of data in a buffer, the first block being a plurality of data words including a first word; and then
   b) performing a boolean operation between the first word in the buffer and a first corresponding word of a second block being received one word at a time and not stored in the buffer, to yield a first result word;
   c) storing the first result word in the buffer overwriting the first word;
   d) repeating steps b) and c) upon a second word in the buffer and a second corresponding word of the second block not stored in the buffer, to yield a second result word, the second result word being stored in the buffer overwriting the second word; and
   e) transferring the first and second result words to a memory.

23. The method of claim 22 wherein the step of performing a boolean operation is performing a bit-wise exclusive-or.

24. The method of claim 22 further comprising programming the addresses of the first and second words and the result word prior to the operations of (a)–(e), wherein the operations (a)–(e) occur in response to said programming.

25. A data processor comprising:
   an internal bus;
   an accelerator circuit coupled to the internal bus, the accelerator circuit having a bus interface coupled to the internal bus, a boolean unit to perform a boolean operation on first and second data words received from the bus interface to output a result word, a buffer coupled to the boolean unit and having capacity to store at least one block of data, each block being a plurality of words, the accelerator circuit being configured to store the first word in the buffer, perform the boolean operation on said first and second words, store the result word in the buffer overriding the first word, and transfer the result word to the bus interface; and
   a plurality of memory-mapped address registers being a programming interface to the accelerator circuit for programming the addresses of the first and second words and the result word.

26. The data processor of claim 25 wherein the accelerator circuit is configured with the boolean operation being a bit-wise exclusive-or.

27. The data processor of claim 25 wherein the accelerator circuit further includes a data path around the boolean unit for the first word to bypass the boolean unit and be stored in the buffer.

28. The data processor of claim 25 wherein the accelerator circuit is further configured to store a first block in the buffer before the boolean unit receives a second block one word at a time.

29. The data processor of claim 25 further comprising a memory controller coupled to the internal bus to communicate with the accelerator circuit, the accelerator circuit being further configured to request a read of the first and second data words from the memory controller and request a write of the result word to the memory controller.

30. The data processor of claim 25 wherein one of the address registers is configured to receive the address of a descriptor, the descriptor to specify the starting address of a block of data containing said first word.

31. The data processor of claim 25 wherein the address registers specify the addresses of a plurality of linked descriptors, the data processor being further configured to perform the boolean operation on a plurality of blocks of data specified by the linked descriptors.

32. The data processor of claim 25 further comprising a processor coupled to the internal bus and configured to access the memory-mapped registers to program the addresses of the first and second words into the registers.

33. The data processor of claim 25 wherein the accelerator circuit is programmed with a source address of a block of data and a destination address, the accelerator circuit being further programmed to fetch the block from the source address and store the block in the buffer, and subsequently transfer the block from the buffer to the destination address without performing the boolean operation.

* * * * *